United States Patent [19]
Hamilton

[11] Patent Number: 5,857,738
[45] Date of Patent: Jan. 12, 1999

[54] TAILGATE REMOVAL DETERRENT DEVICE

[76] Inventor: Jerry P. Hamilton, RR 2, Box 85A, Sinton, Tex. 78387-9726

[21] Appl. No.: 954,848

[22] Filed: Oct. 21, 1997

[51] Int. Cl.$^6$ .................................................. B62D 25/00
[52] U.S. Cl. ............................. 296/57.1; 296/50; 16/254; 16/380; 292/DIG. 29
[58] Field of Search ............................. 296/52, 53, 57.1, 296/50, 106; 16/254, 261, 262, 38; 292/300, 305, DIG. 29

[56] References Cited

U.S. PATENT DOCUMENTS

| | | | |
|---|---|---|---|
| 3,656,801 | 4/1972 | Doutt et al. | 296/57.1 |
| 5,004,287 | 4/1991 | Doyle . | |
| 5,039,154 | 8/1991 | Lewis . | |
| 5,415,058 | 5/1995 | Young et al. . | |

*Primary Examiner*—Joseph D. Pape
*Assistant Examiner*—Chad D. Wells
*Attorney, Agent, or Firm*—George S. Gray

[57] ABSTRACT

A device is provided which significantly deters the theft of tailgates from pickup trucks. The shaft member of a typical tailgate hinge mechanism is secured by a rotatable cup within the cup fixed to the tailgate. The open slotted sectors on both cups are aligned to allow passage of the shaft member. After passage of the shaft member, the rotatable cup is moved until the open slotted sectors are out of alignment, preventing movement of the shaft member out of the cups. A wall sector is also provided which attaches to the exterior surface of the rotatable cup after the shaft member has been positioned within. It is closely received by the open slotted sector of the used cup which prevents further rotation of the rotatable cup within the fixed cup.

9 Claims, 5 Drawing Sheets

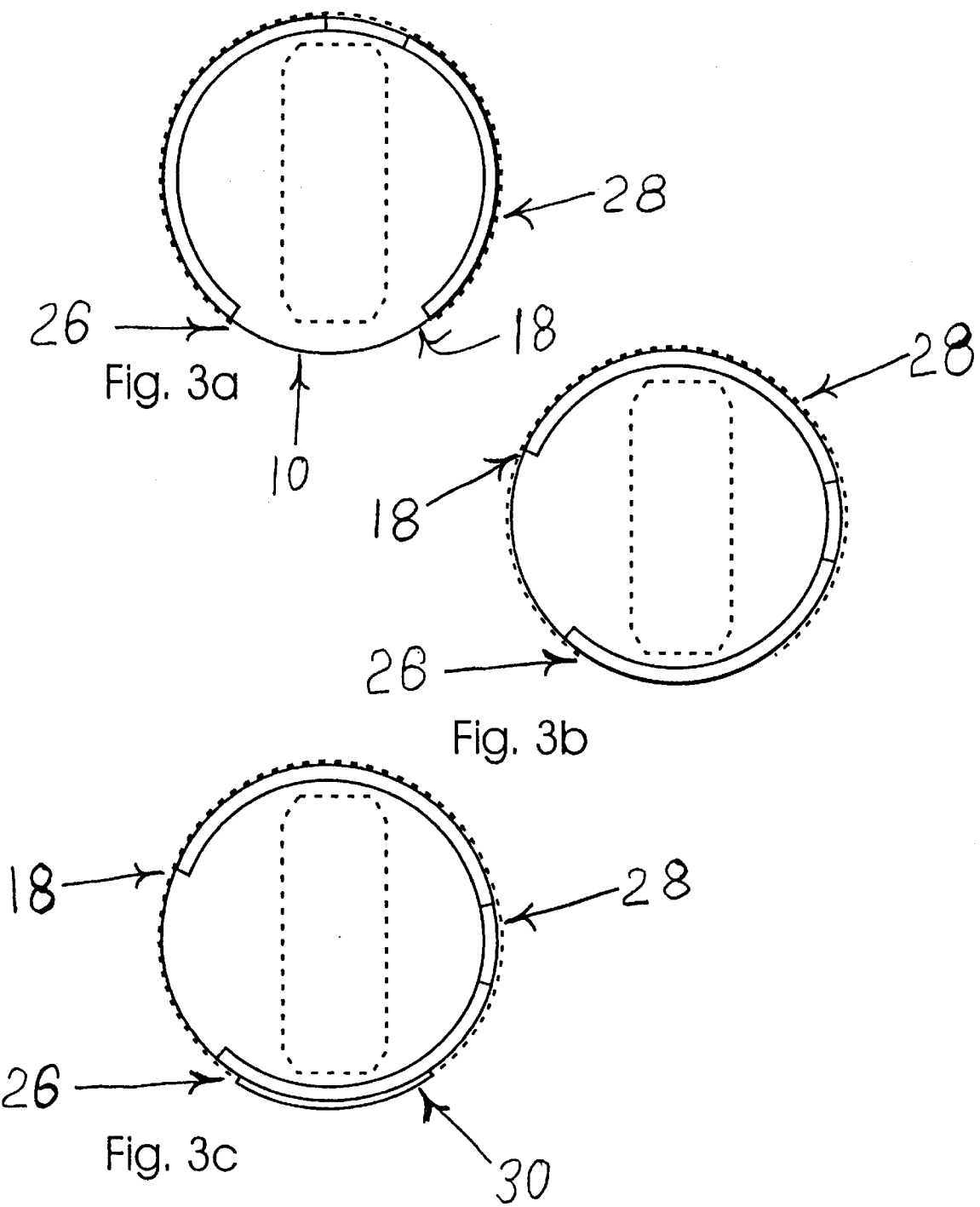

1

TAILGATE REMOVAL DETERRENT DEVICE

BACKGROUND

For several years pickup truck owners have been plagued by tailgate theft. These thefts stem from the tailgate hinge design, which allows one end of the tailgate to pull free of the hinge when the tailgate is lowered to a particular position. When in that position, a shaft member is free to move from a fixed receiving cup in which the shaft member is normally situated. The shaft member moves from the receiving cup through an open slotted sector designed for that purpose. Tailgate thieves find it easy to lower the tailgate to the well known removal position, and pull the shaft member from the receiving cup.

Currently, the known methods for combating this problem, typically involve significant hardware additions, and usually involve keyed locks. Some involve locking the tailgate itself, which reduces the convenience and utility of the tailgate during ordinary usage.

What is needed is a simple means of combating tailgate theft, with a minimum of hardware, and without the necessity of locking the tailgate.

SUMMARY OF THE INVENTION

My invention is a small, inexpensive device which deters the theft of a pickup tailgate by significantly complicating the removal of the shaft member from the tailgate hinge. With my invention in place, the thief must first reposition my device within the tailgate hinge mechanism by the use of hand tools. In one alternative embodiment of my invention, the thief must literally destroy the device to successfully remove the shaft member from the tailgate fixed receiving cup. All of this additional activity takes time, which the typical thief will not have available.

My device is a rotatable shaft receiving cup which fits snugly within the tailgate fixed receiving cup and can be rotated while so positioned. My device has an open slotted sector which can be aligned with the open slotted sector on the tailgate fixed receiving cup, allowing the shaft member to be received within the tailgate fixed receiving cup, and within my device. When my device is rotated such that its open slotted sector is no longer aligned with the open slotted sector on the tailgate fixed receiving cup, the shaft member is secured within, regardless of tailgate position.

In an alternative embodiment of my device, a separate wall sector is provided, which attaches to the exterior surface of the device, and is sized to be closely received by the tailgate receiving cup open slotted sector. After installing the device, this additional wall sector is attached to the device exterior surface, such that it is closely received by the tailgate fixed receiving cup open slotted sector. This effectively eliminates any further rotation of the device within the tailgate fixed receiving cup, until such wall sector is removed.

Various means of attaching the wall sector are provided, depending on the material used for my device and the desire of the user for permanent or temporary attachment. For example, a low or high density polyethylene material would allow readily available bonding agents to permanently affix the wall sector to the devices exterior surface. Similarly, a steel device would allow permanent attachment by spot welding.

For a repeatable attachment, commercially available fasteners of various types will suffice. Generally, the level of difficulty or force required to separate the attachment, will be directly related to the level of theft deterrence provided.

To assist in the installation of my device, an exposed notch can be included which allows the rotation of the device by hammering a screwdriver against the notch. This causes the two open slotted sectors to be unaligned, securing the shaft member in the tailgate receiving cup.

BRIEF DESCRIPTION OF THE DRAWINGS

FIGS. 3a–c depict a side view of the device within the tailgate hinge mechanism, with the device depicted in the receiving, closed, and fixed positions, respectively.

DETAILED DESCRIPTION OF THE PREFERRED EMBODIMENTS

Figure 1:
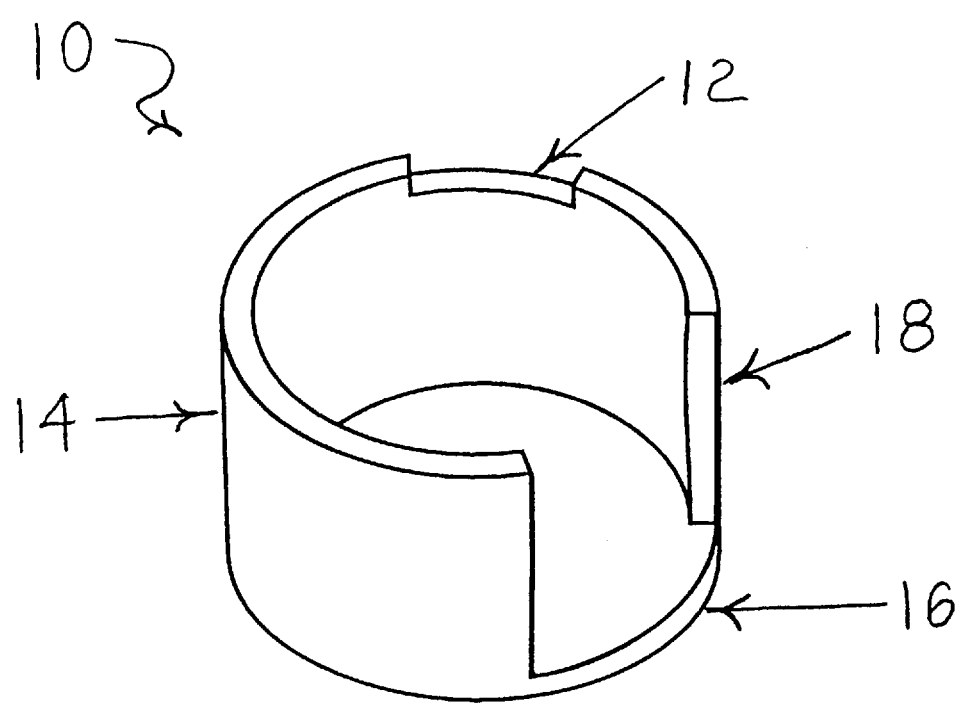
FIG. 1 is an oblique drawing of the preferred embodiment of the tailgate removal deterrent device.
Figure 2A:
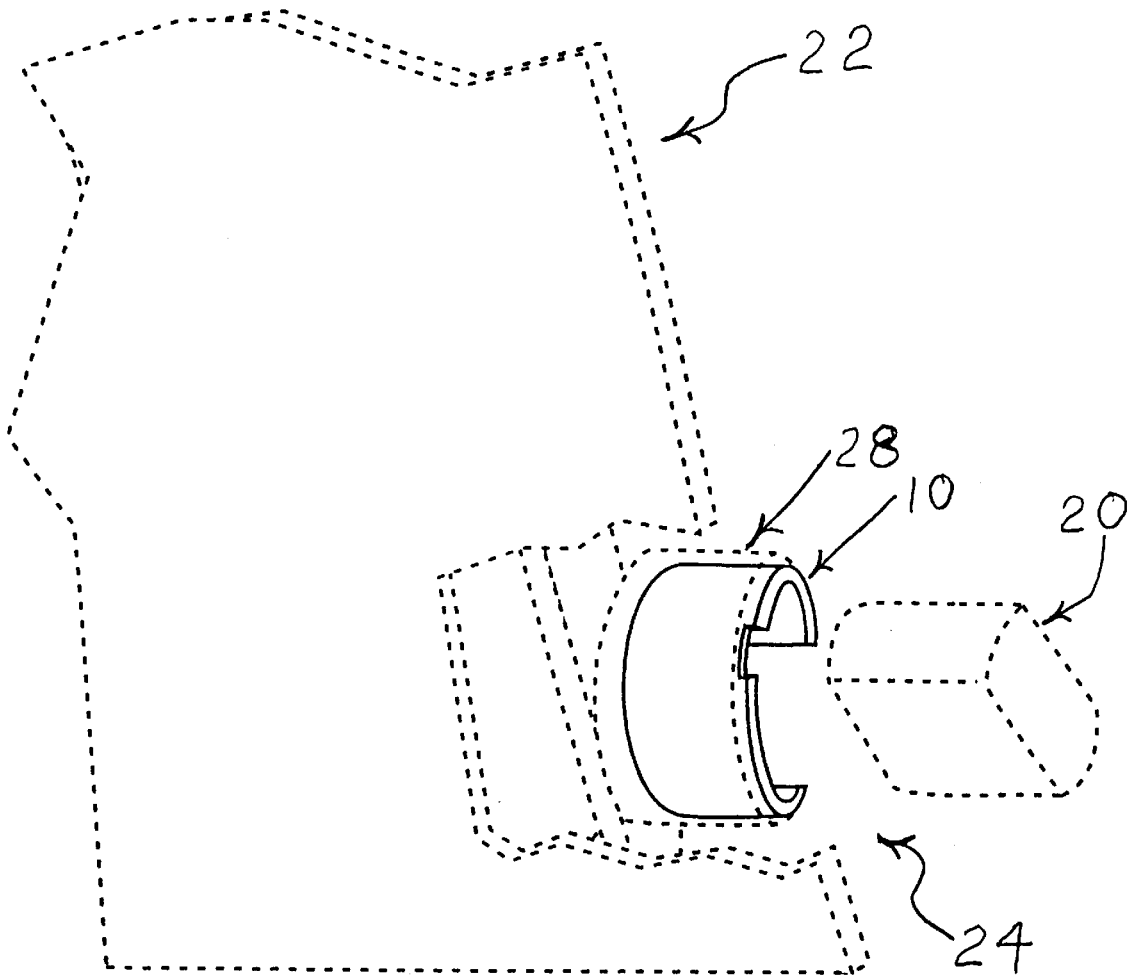
FIG. 2a is an oblique drawing of a section of a tailgate hinge mechanism and the device, which depicts the fixed shaft member positioned for entry into the device.
Figure 2B:
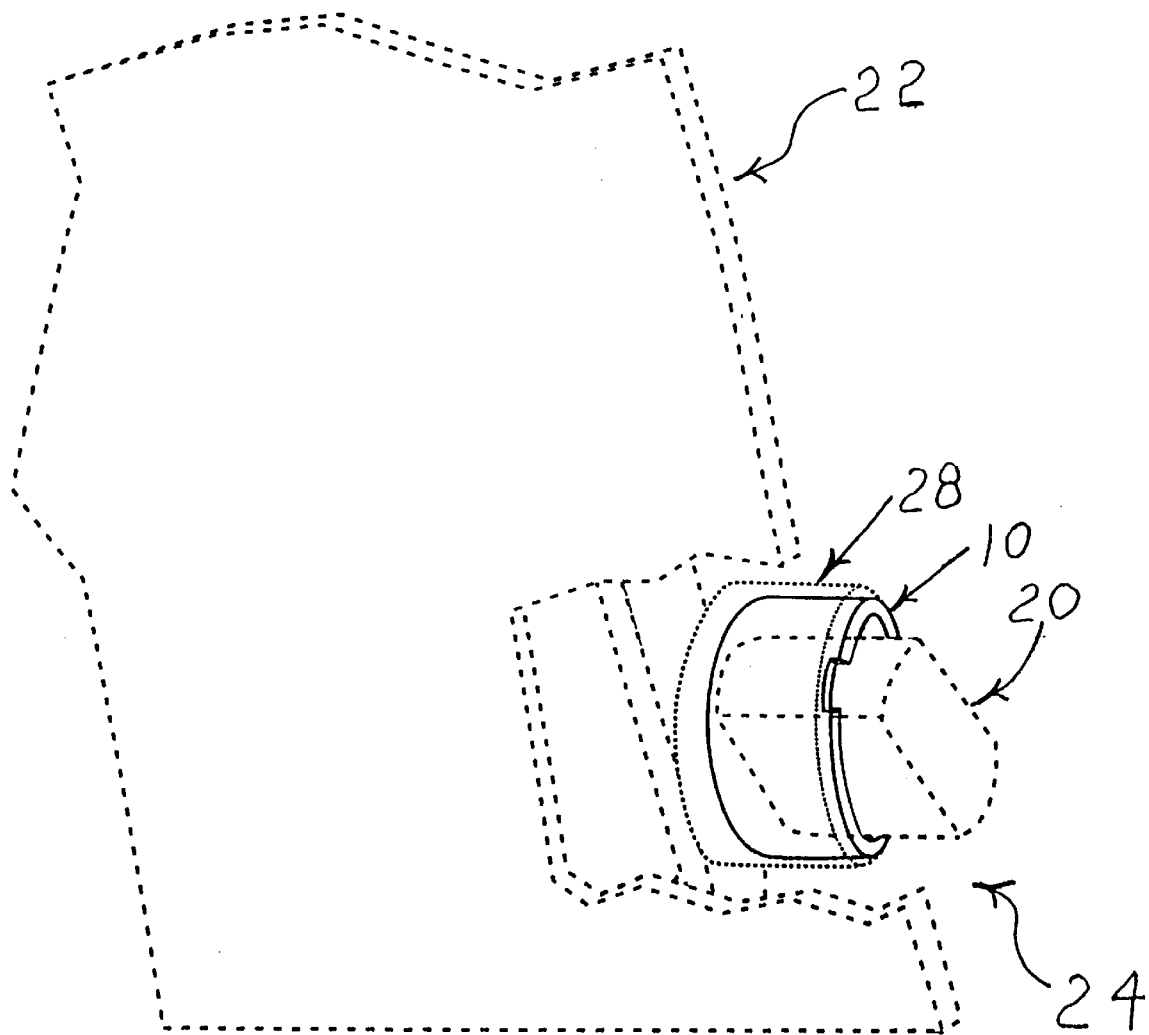
FIG. 2b is an oblique view of the tailgate hinge mechanism depicting the fixed shaft member within the device.
Figure 4:
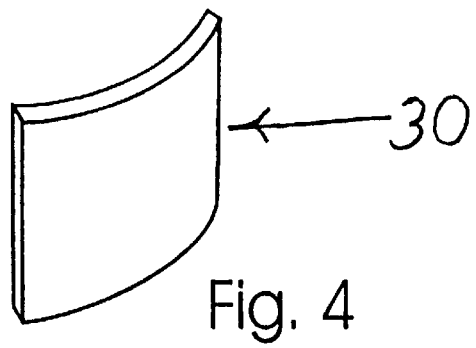
FIG. 4 is an oblique view of a wall sector.
Figure 5:
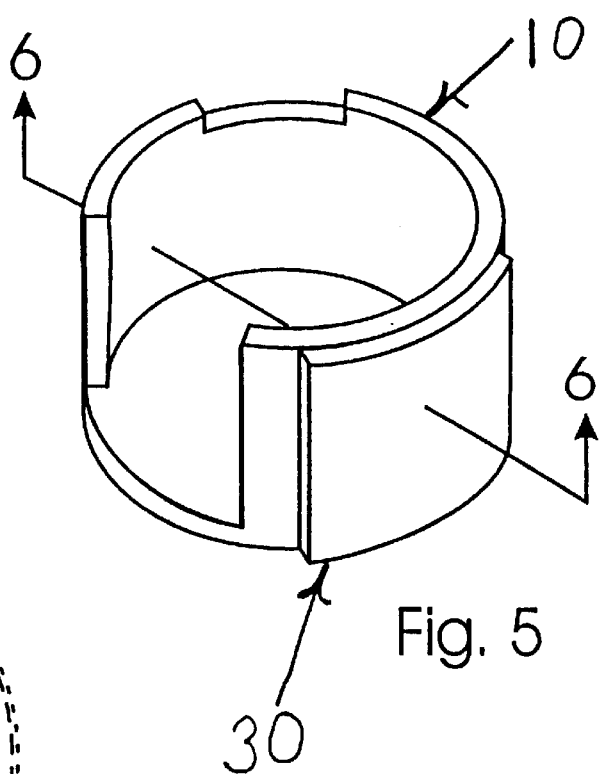
FIG. 5 is an oblique view of the device with the wall sector attached.

FIGS. 1–2b depict the cup 10 with the notch 12 included. In the preferred embodiment, the cup 10 has a generally circular wall 14, with a flat bottom 16. An open slotted sector 18 is present in the wall 14. The open slotted sector 18 is sized to allow the passage of the fixed shaft member 20 portion of the tailgate 22. The cup 10 is sized such that the entire shaft member 20 length and width fit within the interior circumference of the cup wall 14. The notch 12 is formed in the upper cup wall 14 as shown in FIG. 1. The cup 10 can be formed from a variety of materials, including, steel, aluminum, plastic, and low density or high density polyethylene.

FIGS. 2a–b depict a typical tailgate hinge mechanism 24, with the shaft member 20, positioned for insertion through the aligned open slotted sectors 26,18 of the fixed cup 28 and the rotatable cup 10. FIGS. 3a–c provides a view along the longitudinal axis of the shaft member 20, with the shaft member mounting structure removed for illustration purposes. The open slotted sectors 18,26 are aligned in FIG. 3a, and the shaft member 20 is shown within the rotatable cup 10. In FIG. 3b, the rotatable cup 10 has been rotated such that the open slotted sectors 18,26 are no longer aligned and the shaft member 20 is retained within the rotatable cup 10.

Figure 6:
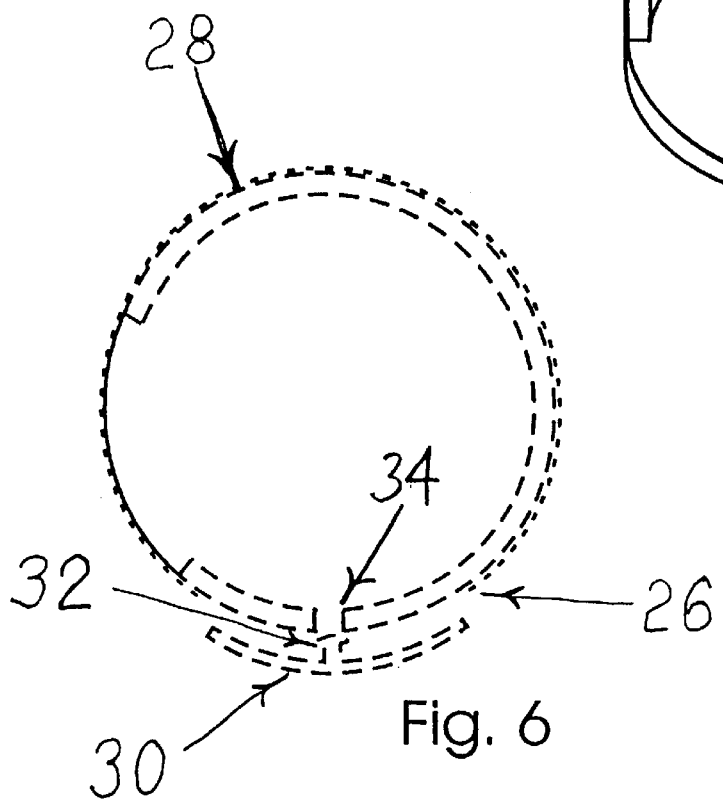
FIG. 6 is a cross sectional view of the device cut along cutting plane 6—6 on FIG. 5.

In an alternative embodiment, shown in FIGS. 3c–6, a wall sector 30 is provided which is sized to fit flush against the exterior surface of the cup wall 14. The wall sector 30 is further sized to be closely received within the open slotted sector 18 of the fixed cup 10 on the tailgate 22. Various alternatives for attaching the wall sector 30 to the cup wall 14 are available including screws, bolts, snaps, glue, and welding. An alternative embodiment of my invention is shown in FIG. 6 which includes a protrusion 32 with an enlarged head which extends from the interior side of the wall sector 30, which snaps securely into a hole 36 in the cup wall 14. High density polyethylene works particularly well for this particular fastener.

Although the present invention has been described in considerable detail with reference to certain preferred and alternate embodiments thereof, other embodiments are possible. Accordingly, the spirit and scope of the above description of the invention, should not be limited to the description of the embodiments contained herein.

I claim:

1. In combination with a vehicle having a body and a tailgate mounted on the body, the tailgate being attached to the body by a hinge mechanism having a rotational axis, such hinge mechanism comprising a shaft member, the shaft member being received by a fixed receiving cup for rotation of the shaft member within the cup, the fixed receiving cup having a wall containing an open slotted sector for passage of the shaft member therethrough, whereby the tailgate may be installed or removed from the body, a tailgate removal deterrent device comprising:

a rotatable receiving cup, the rotatable receiving cup being closely received by and rotatable within the fixed receiving cup, the rotatable receiving cup having a wall, the rotatable receiving cup wall having an open slotted sector, the rotatable receiving cup open slotted sector being positioned on the rotatable receiving cup wall, such that it is alignable with the fixed receiving cup open slotted sector by rotation, such alignment allowing passage of the shaft member from the fixed receiving cup, the rotatable receiving cup open slotted sector being further positioned on the rotatable receiving cup wall, such that, when not aligned with the fixed receiving cup open slotted sector, the shaft member is held within the rotatable receiving cup.

2. The tailgate removal deterrent device of claim 1, further comprising rotation assistance means.

3. The tailgate removal deterrent device of claim 2, wherein the rotation assistance means comprises the rotatable receiving cup wall, the rotatable receiving cup wall having a top edge, the rotatable receiving cup wall top edge having a notch.

4. The tailgate removal deterrent device of claim 1, further comprising rotatable receiving cup rotation prevention means, such that the rotatable receiving cup is prevented from rotating within the fixed receiving cup after the shaft member is secured within the rotatable receiving cup.

5. The tailgate removal deterrent device of claim 4, wherein the rotatable receiving cup rotation prevention means comprises:

the rotatable receiving cup wall, the rotatable receiving cup wall having an exterior surface;

a rotation prevention wall sector, the rotation prevention wall sector being shaped to lie against the rotatable receiving cup wall exterior surface, and being further shaped to be closely received by the fixed receiving cup open slotted sector; and rotation prevention wall sector attachment means, such that the rotation prevention wall sector may be attached to the rotatable receiving cup wall exterior surface following rotation of the rotatable receiving cup within the fixed receiving cup.

6. The tailgate removal deterrent device of claim 5, wherein the rotation prevention wall sector attachment means, rotation prevention wall sector and subsequent reattachment of the rotation prevention wall sector.

7. The tailgate removal deterrent of claim 6, wherein the rotation prevention wall sector attachment means comprises:

the rotatable receiving cup wall having a hole;

the rotation prevention wall sector further having an interior surface, the rotation prevention wall sector interior surface having a protrusion, the rotation prevention wall section interior surface protrusion being shaped such that it is closely received and secured by the rotatable receiving cup wall hole.

8. The tailgate removal deterrent device of claim 5, wherein the rotation prevention wall sector attachment means comprises a bonding agent, such that the rotation prevention wall sector cannot be removed from the rotatable receiving cup wall exterior surface, without damaging such surface.

9. The tailgate removal deterrent of claim 5, where the rotation prevention wall sector attachment is such that the attachment of the rotation prevention wall sector to the rotatable receiving cup wall exterior surface is permanent.

\* \* \* \* \*